United States Patent [19]
Hirose et al.

[11] Patent Number: 5,726,531
[45] Date of Patent: Mar. 10, 1998

[54] ELECTROLUMINESCENT ELEMENT

[75] Inventors: Koji Hirose; Shigehiko Aoki, both of Tokyo, Japan

[73] Assignee: Seiko Precision Inc., Japan

[21] Appl. No.: 699,193

[22] Filed: Aug. 19, 1996

Related U.S. Application Data

[63] Continuation of Ser. No. 216,808, Mar. 23, 1994, abandoned.

[30] Foreign Application Priority Data

Mar. 29, 1993 [JP] Japan ................................. 5-070240
Apr. 27, 1993 [JP] Japan ................................. 5-101184

[51] Int. Cl.$^6$ ................................................. H05B 33/02
[52] U.S. Cl. ........................ 313/509; 313/502; 313/506
[58] Field of Search ................................. 313/509, 502, 313/506, 498

[56] References Cited

U.S. PATENT DOCUMENTS

| | | | |
|---|---|---|---|
| 4,143,297 | 3/1979 | Fischer | 313/502 |
| 4,560,902 | 12/1985 | Kardon | 313/502 |
| 4,876,481 | 10/1989 | Taniguchi et al. | 313/502 |
| 5,069,815 | 12/1991 | Aoki et al. | 252/301.36 |
| 5,076,963 | 12/1991 | Kameyama et al. | 313/502 |
| 5,200,668 | 4/1993 | Ohashi et al. | 313/506 |
| 5,281,489 | 1/1994 | Mori et al. | 313/498 |
| 5,332,946 | 7/1994 | Eckersley et al. | 313/509 |
| 5,336,345 | 8/1994 | Gustafson et al. | 313/509 |

*Primary Examiner*—Ashok Patel
*Assistant Examiner*—Vip Patel
*Attorney, Agent, or Firm*—Adams & Wilks

[57] ABSTRACT

An electroluminescent element has an enhanced luminosity when incorporated in a desired range. Interposed between a transparent electrode and a rear electrode is a luminescent layer and an insulating layer for providing thermal stability. The luminescent layer contains a luminescent material and a binder having a high dielectric constant. The luminescent layer contains 82.0 to 85.5% of a luminescent material in order to maximize the luminosity of an electroluminescent element. When a fluorescent pigment is added, i.e., a yellow pigment, green pigment or orange pigment, in a proportion not greater than 1.9% by weight, the luminosity of the electroluminescent element is enhanced even further. Optimal results are achieved when the average particle diameter of the luminescent material is restricted to 21 microns. An electroluminescent element produced as described is visually identical to a known element yet capable of emitting a greater amount of light under a smaller load.

16 Claims, 4 Drawing Sheets

Proportion of luminescent material and the brightness of light

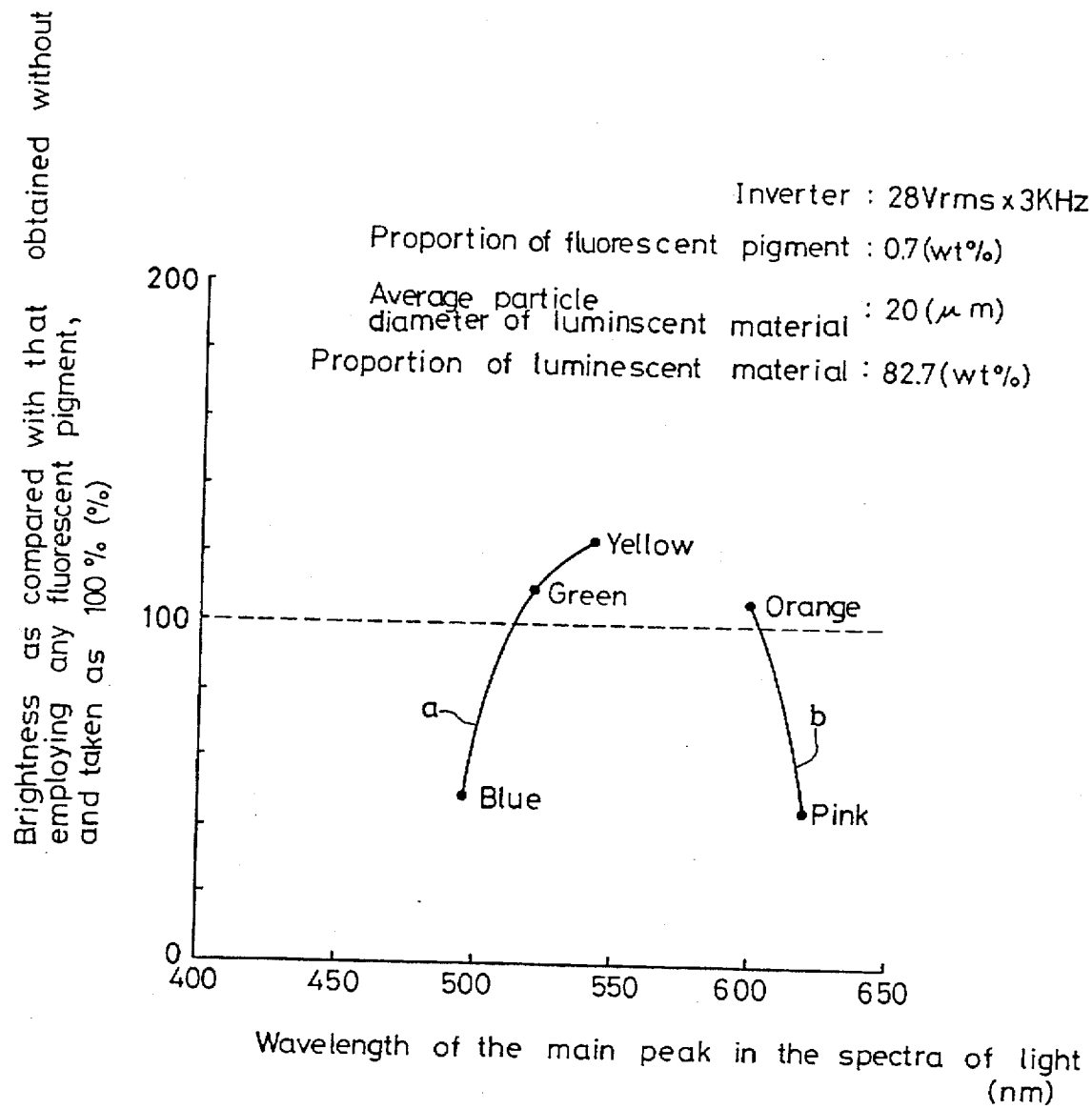

ELECTROLUMINESCENT ELEMENT

This is a continuation of application Ser. No. 08/216,808 filed Mar. 23, 1994, now abandoned.

BACKGROUND OF THE INVENTION

1. Field of the Invention

This invention relates to an electroluminescent (EL) element.

2. Description of the Prior Art

There is known an EL element including a luminescent layer and an insulating layer which are interposed between a transparent electrode and a rear electrode which are in turn interposed between a pair of laminated moisture barrier films, such as polyamide films, which are enclosed between a pair of laminated moistureproof films joined together along their edges by heat sealing under pressure.

It is known to obtain an EL element having an improved luminosity by employing a luminescent member having an improved light-emitting property in its luminescent layer, a binder having an improved dielectric constant for the luminescent member, a transparent conductive film having an improved light transmittance as its transparent electrode, or a moistureproof film having an improved light transmittance. Despite these attempts to improve the luminosity, of the EL element however, the known EL element fails to exhibit a satisfactorily high luminosity by a limited amount of energy supplied by a battery when it is used in, for example, a wristwatch having to rely upon a small battery.

SUMMARY OF THE INVENTION

It is, therefore, an object of this invention to provide an improved electroluminescent element which emits light having a satisfactorily high degree of brightness even though it may be supplied with only a limited amount of energy by a small battery.

According to a first aspect of this invention, the object thereof is attained by an electroluminescent element having a luminescent layer and an insulating layer which are interposed between a transparent electrode and a rear electrode, the luminescent layer containing a luminescent member and a highly dielectric binder, the proportion of the luminescent member in the luminescent layer being from 82.0 to 85.5% by weight. The luminescent layer containing the luminescent member in the proportion of 82.0 to 85.5% by weight enables the element to give off light having a high degree of brightness. The proportion of the luminescent member is preferably from 82.5 to 85.0% by weight.

According to a second aspect of this invention, the object thereof is attained by an electroluminescent element having a luminescent layer containing a luminescent member and an insulating layer which are interposed between a transparent electrode and a rear electrode, the luminescent layer further containing not more than 1.9% by weight of a yellow, green or orange fluorescent color. The luminescent member in the luminescent layer emits light upon application of an alternating current, and the light thereby emitted causes the fluorescent color to emit fluorescent light, so that the combination of the luminescent member and the fluorescent color enables the element to give off light having a high degree of brightness. The element of this invention hardly differs from any known element in either the color of the light which it emits, or the color which it presents when it does not emit any light. It requires only a smaller amount of electric current than any known element to emit light having brightness which is comparable to that of the light emitted by the latter. The luminescent layer preferably contains the luminescent member in the proportion of 82.0 to 85.0% by weight to emit light having an improved brightness. The luminescent member in the luminescent layer preferably has an average particle diameter not exceeding 21 microns to emit light having an improved brightness.

BRIEF DESCRIPTION OF THE DRAWINGS

FIG. 4 is a graph showing the relationship between a fluorescent color added to the luminescent layer of the element as shown in FIG. 3 and the brightness of light thereby emitted.

DETAILED DESCRIPTION OF THE INVENTION

Figure 1:
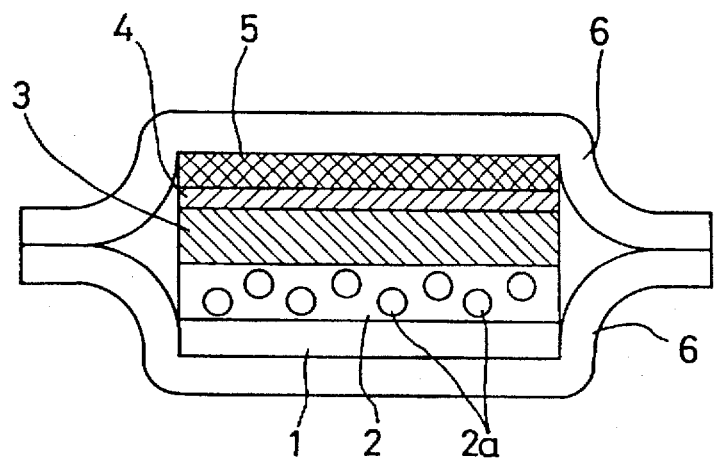
FIG. 1 is a cross sectional view of an element embodying the present invention according to the first aspect thereof.

Description will now be made in detail of an electroluminescent element embodying the present invention according to the first aspect thereof with reference to FIGS. 1 and 2. The element comprises a transparent conductive film 1 defining a transparent electrode, a luminescent layer 2 formed thereon, an insulating layer 3 formed on the luminescent layer 2, and a rear electrode 4 formed on the insulating layer 3, as shown in FIG. 1. The insulating layer 3 is a printed and dried product of a mixture of e.g. barium titanate and a highly dielectric binder. The rear electrode 4 is a printed and dried product of a conductive paste prepared by mixing a carbon powder with a binder. The element also includes a desiccant layer 5 formed on the rear electrode 4 as a printed and dried product of a desiccant paste prepared by mixing a resin and a binder, and a pair of transparent moistureproof films 6 of e.g. trifluoropolychloroethylene covering the outer surfaces of the transparent conductive film 1 and the desiccant layer 5 and joined together along their edges by heat sealing under pressure.

The luminescent layer 2 is usually formed by printing and drying from a mixture of a luminescent member, or material 2a, such as zinc sulfide, and a highly dielectric binder, such as cyanoethyl cellulose. A sample was prepared of an electroluminescent element having a luminescent layer 2 and an insulating layer 3 formed from a luminescent ink and a dielectric ink having the composition shown below, respectively:

Composition of the Luminescent Ink:

Luminescent material: 50 g of zinc sulfide;

Highly dielectric binder: 9.5 g of a mixture containing cyanoethylated polyvinyl alcohol, cyanoethylpluran and propylene carbonate (as a solvent) in the ratio of 2:8:25 (by weight);

Composition of the Dielectric Ink:

Dielectric material: 60 g of barium titanate;

Highly dielectric binder: 35 g of the same binder as that used for the ink.

The luminescent layer 2 contained the luminescent material in the proportion of 84.0% by weight. While the conventional luminescent material usually has an average particle diameter of 24 to 26 microns, the luminescent material in the sample had an average particle diameter of 20 microns as a result of classification by sieving.

A plurality of other samples were prepared employing inks containing the luminescent material 2a in different proportions. These samples were each tested for emission of light in an area of 4.9 cm² by employing an inverter circuit having an output of 28 V rms at 3 kHz. The results are shown in FIG. 2 which shows the relation as determined between the proportion of the luminescent material 2a and the brightness or intensity of the light thereby emitted.

Figure 2:
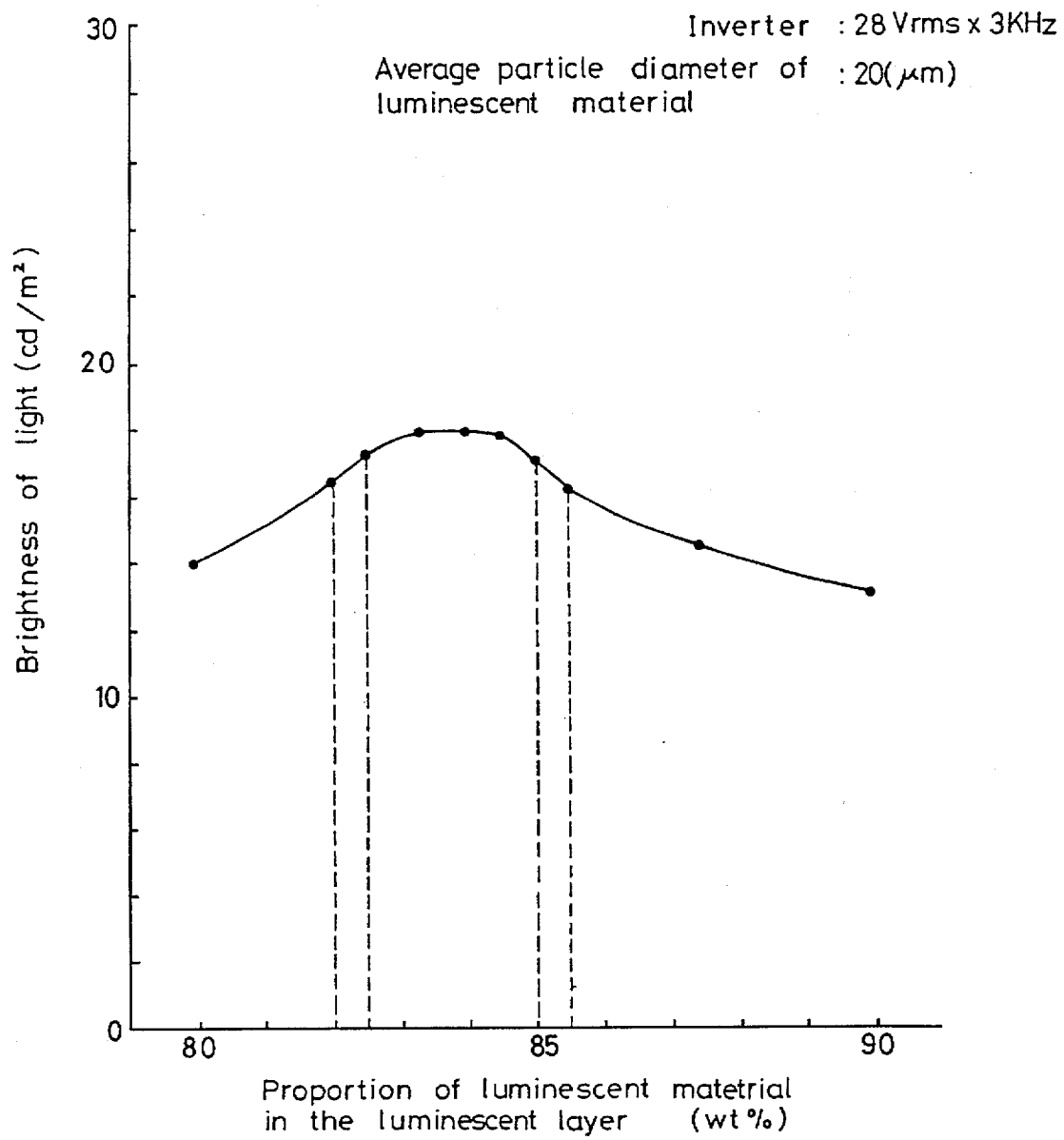
FIG. 2 is a graph showing the relationship between the proportion of a luminescent member in an ink and the brightness of light thereby emitted.

While the luminous intensity of the electroluminescent element depends on the proportion of the luminescent material 2a, it does not necessarily become higher with an increase in the proportion of the luminescent material 2a, but its proportion has a specific range in which a particularly high luminous intensity can be obtained, as is obvious from FIG. 2. More specifically, a particularly high luminous intensity can be obtained when the proportion of the luminescent material 2a in the ink is in the range of 82.5 to 85.0% by weight. Other experiments have, however, confirmed that a luminous intensity which is fully satisfactory for practical purposes can also be obtained if the proportion of the luminescent material is in the range of 82.0 to 85.5% by weight.

Figure 3:
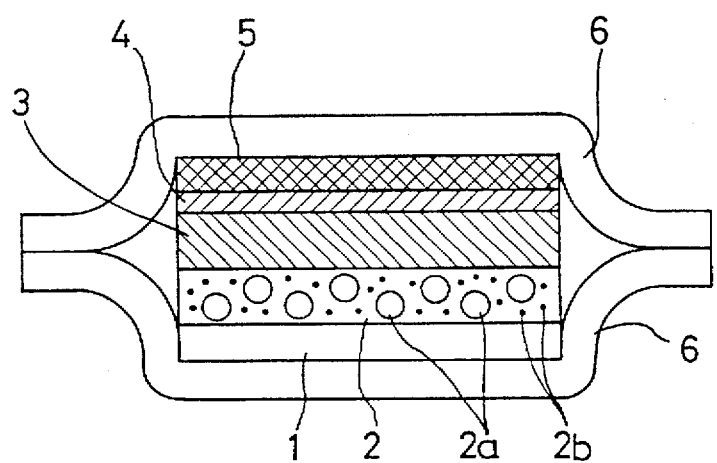
FIG. 3 is a cross sectional view of an element embodying the present invention according to the second aspect thereof.

Attention is now directed to FIGS. 3 and 4 for the description of an electroluminescent element embodying this invention according to the second aspect thereof. It is basically identical in construction to the element shown in FIG. 1, but further contains an appropriate amount of a fluorescent color, or pigment 2b in its luminescent layer 2. The elements of FIGS. 1 and 3 are otherwise identical in construction, and no repeated description is, therefore, made of any of the common parts which are shown by the same reference numerals in both of FIGS. 1 and 3.

An electroluminescent element having luminescent and insulating layers 2 and 3 formed from luminescent and dielectric inks having the compositions shown below, respectively, was prepared as Sample A embodying this invention:

Composition of the Luminescent Ink:

Luminescent material: 50 g of zinc sulfide having an average particle diameter of 20 microns;

Highly dielectric binder: 10 g of a mixture containing cyanoethylated polyvinyl alcohol, cyanoethylpluran and propylene carbonate (as a solvent) in the ratio of 2:8:25 by weight;

Fluorescent pigment: 0.425 g of a yellow pigment;

Composition of the Dielectric Ink:

Dielectric material: 60 g of barium titanate;

Highly dielectric binder: 35 g of the same binder as that used for the luminescent ink.

The luminescent layer of Sample A contained the luminescent material in the proportion of 82.7% by weight and the fluorescent pigment in the proportion of 0.7% by weight, as shown in TABLE 1. Sample A was tested for giving off light in an area of 4.9 cm² by employing an inverter circuit having an output of 28 V rmS at 3 kHz, and exhibited a luminous intensity of 22 cd/m², as shown in TABLE 2.

For comparison purposes, two conventional elements not containing any fluorescent pigment were prepared as Samples B and C shown in TABLE 1, and were tested under the same conditions with Sample A. The results are shown in TABLE 2.

TABLE 1

| Sample | Average particle diameter of luminescent material (microns) | Proportion of luminescent material (wt. %) | Proportion of fluorescent pigment (wt. %) |
| --- | --- | --- | --- |
| A | 20 | 82.7 | 0.7 |
| B | 26 | 85.7 | 0 |
| C | 20 | 83.3 | 0 |

TABLE 2

| Sample | Electrostatic capacity (nF) | Loss factor (tan) | Luminous intensity (cd/m²) | Current consumption (mA) |
| --- | --- | --- | --- | --- |
| A | 1.80 | 0.037 | 22 | 10.0 |
| B | 1.80 | 0.055 | 13 | 11.2 |
| C | 1.85 | 0.045 | 18 | 10.5 |

As is obvious from TABLE 2, Sample A embodying this invention exhibited a luminous intensity which was 69% and 22% higher than those achieved by Samples B and C, respectively, while it required only a lower consumption of electric current than Samples B and C.

Discussion will now be made of the brightness and color of light as obtained when the fluorescent pigment was employed in different proportions. The pigment was a yellow one. The brightness of light showed a sharp increase with an increase in the proportion of the pigment up to 1.5% by weight and continued to increase with a further increase in the proportion of the pigment. The increase in brightness was, however, less sharp when the proportion of the pigment exceeded 1.9% by weight.

While the increase in the proportion of the fluorescent pigment was found to bring about an increase in the brightness of the light emitted by the luminescent layer 2, it was also found to affect the color of the light and the color which the layer presented when it did not emit any light. The luminescent layer not containing any fluorescent pigment emitted light having a bluish green color. The addition of a yellow pigment caused it to emit light having a different color and the color of the light varied with the proportion of the pigment added. While it was bluish green when the proportion of the pigment was up to 0.7% by weight, it was green when the proportion was from 0.7 to 1.5% by weight, and yellowish green when the proportion exceeded 1.5% by weight. Insofar as an ordinary electroluminescent element gives off light having a blue, bluish green, or green color, it is also preferable for the element of this invention to contain a yellow pigment in a proportion not exceeding 1.5% by weight to emit light having a color not differing from that of the color emitted by the ordinary element. It has, however, been experimentally confirmed that the addition of even 1.9% by weight of any such pigment enables the emission of light having a color close to green, and not presenting any substantial problem in the practical use of the element.

The fluorescent pigment was also found to affect the color of the luminescent layer 2 itself, i.e. the color which it presented when it did not emit any light. The layer not containing any such pigment presented an ivory color. The addition of a yellow fluorescent pigment caused it to present a different color and its color varied with the proportion of the pigment added. It presented a color between ivory and yellow when the proportion of the pigment was up to 1.5% by weight, and a yellow color when the proportion exceeded 1.5% by weight. Insofar as an ordinary electroluminescent element presents an ivory color on its luminescent layer, it is also preferable for the element of this invention to contain a yellow pigment in a proportion not exceeding 1.5% by weight to present a color not differing from that presented by the ordinary element. It has, however, been confirmed that the addition of even about 1.9% by weight of any such pigment does not present any substantial problem in the practical use of the element.

Discussion will now be made of the results of the experiments conducted to compare the brightness of light when fluorescent pigments having different colors were employed. The luminescent material in each sample employed had an average particle diameter of 20 microns, and its luminescent layer contained the luminescent material in the proportion of 82.7% by weight and the fluorescent pigment in the proportion of 0.7% by weight. The results are shown in FIG. 4, in which the abscissa axis represents the wavelength (nm) of the main peak in the spectra of light emitted, and the ordinate axis shows the brightness of light in percentage as compared with that which was obtained by an element not containing any fluorescent pigment, and which was taken as 100%. A yellow pigment was found to be more effective than any other pigment having a different color as it enabled 125% of brightness, though green and orange pigments were also found to be effective as they enabled 100% and 108%, respectively, of brightness, as is obvious from curves a and b in FIG. 4. Blue and pink pigments were found unsuitable, as they brought about a great reduction in brightness to about 50%.

While it has been usual to employ a luminescent material having an average particle diameter of 24 to 26 microns, it has been experimentally confirmed that the luminous intensity of an electroluminescent element, or the brightness of light thereby emitted is significantly affected by the particle diameter of the luminescent material employed. Experiments were made to compare the brightness of light emitted by luminescent layers containing in the same proportion luminescent materials having different average particle diameters. As a result, it was found that the smaller the average particle diameter, the higher brightness could be obtained, and that the use of a material having an average particle diameter exceeding 21 microns brought about a sharp reduction in brightness. Thus, the element of this invention preferably contains a luminescent material having an average particle diameter not exceeding 21 microns, as hereinabove described.

The proportion of the luminescent material in the luminescent layer also has a significant bearing on the brightness of light thereby emitted. Experiments were made to compare the brightness of light emitted by luminescent layers containing the luminescent material in different proportions. As a result, it was found that a high level of brightness could be obtained when the proportion of the luminescent material was from 82.0 to 85.0% by weight.

What is claimed is:

1. In an electroluminescent element having a luminescent layer and an insulating layer interposed between a transparent electrode and a rear electrode, said luminescent layer containing a luminescent material, the improvement wherein said luminescent layer contains said luminescent material in the proportion of 82.0 to 85.0% by weight, the average particle diameter of the luminescent material is not greater than 21 microns, and the luminescent layer further contains at most 1.9% by weight of at least one yellow fluorescent pigment, the fluorescent pigment being effective to emit a fluorescent light in response to light emitted by the luminescent material.

2. An electroluminescent element comprising: a luminescent layer comprising a luminescent material, a fluorescent material and a binding material having a high dielectric constant; an insulating layer confronting the luminescent layer; a transparent electrode; and a rear electrode, the luminescent layer and the insulating layer being interposed between the transparent electrode and the rear electrode; wherein the fluorescent material is one of a yellow, green or orange pigment and is added to the luminescent layer in an amount insufficient to substantially alter the color that the luminescent layer would have in the absence of the fluorescent material.

3. An electroluminescent element according to claim 2; wherein the proportion of the luminescent material in the luminescent layer is within the range of 82.5 to 85.0% by weight.

4. An electroluminescent element according to claim 2; wherein the luminescent material has an average particle diameter of not greater than 21 microns.

5. An electroluminescent element comprising: a luminescent layer comprising a luminescent material and at least one fluorescent pigment; an insulating layer confronting the luminescent layer; a transparent electrode; and a rear electrode, the luminescent layer and the insulating layer being interposed between the transparent electrode and the rear electrode; wherein the luminescent material has an average particle diameter of not greater than 21 microns, the luminescent layer contains the luminescent material in a proportion within the range of 82.0 to 85.5% by weight and contains the fluorescent pigment in a proportion no greater than 1.9% by weight, and the fluorescent pigment is effective to emit a fluorescent light in response to light emitted by the luminescent material.

6. An electroluminescent element according to claim 5; wherein the luminescent layer further comprises a binding material having a high dielectric constant.

7. An electroluminescent element according to claim 5; wherein the insulating layer comprises barium titanate and a highly dielectric binder.

8. An electroluminescent element according to claim 5; wherein the rear electrode comprises carbon powder and a binder.

9. An electroluminescent element according to claim 5; further comprising a desiccant layer disposed on the rear electrode and formed of a resin and a binder.

10. An electroluminescent element according to claim 9; further comprising a pair of transparent moistureproof films covering outer surfaces of the transparent electrode and the desiccant layer, respectively, the moistureproof films being heat sealed together at respective edge portions thereof.

11. An electroluminescent element according to claim 10; wherein the pair of moisture proof films are formed of trifluoropolychloroethylene.

12. An electroluminescent element according to claim 5; wherein the luminescent layer comprises zinc sulfide and cyanoethyl cellulose.

13. An electroluminescent element according to claim 5; wherein the luminescent material comprises zinc sulfide and a highly dielectric binder comprising a mixture containing cyanoethylated polyvinyl alcohol, cyanoethylpluran and propylene carbonate in the ration of 2:8:25 by weight.

14. An electroluminescent element according to claim 5; wherein the insulating layer comprises a dielectric ink comprising barium titanate and a highly dielectric binder.

15. An electroluminescent element comprising: a luminescent layer comprising a luminescent material, a fluorescent material and a binding material having a high dielectric constant; an insulating layer confronting the luminescent layer; a transparent electrode; and a rear electrode, the luminescent layer and the insulating layer being interposed between the transparent electrode and the rear electrode; wherein the fluorescent material is one of a yellow, green or orange pigment, is included in the luminescent layer in a proportion of no greater than 1.9% by weight, and is added to the luminescent layer in an amount insufficient to substantially alter the color that the luminescent layer would have in the absence of the fluorescent material.

16. An electroluminescent element comprising: a luminescent layer comprising a luminescent material and at least one fluorescent pigment selected from the group consisting of yellow pigments, green pigments and orange pigments; an insulating layer confronting the luminescent layer; a transparent electrode; and a rear electrode, the luminescent layer and the insulating layer being interposed between the transparent electrode and the rear electrode; wherein the luminescent material has an average particle diameter of not greater than 21 microns, the luminescent layer contains the luminescent material in a proportion within the range of 82.0 to 85.5% by weight and contains the fluorescent pigment in a proportion no greater than 1.9% by weight, and the fluorescent pigment is effective to emit a fluorescent light in response to light emitted by the luminescent material.

* * * * *